US012110719B1

(12) United States Patent
Mattimore

(10) Patent No.: US 12,110,719 B1
(45) Date of Patent: Oct. 8, 2024

(54) TRUNK-LID TIE-DOWN

(71) Applicant: Thomas J. Mattimore, North Syracuse, NY (US)

(72) Inventor: Thomas J. Mattimore, North Syracuse, NY (US)

( * ) Notice: Subject to any disclaimer, the term of this patent is extended or adjusted under 35 U.S.C. 154(b) by 0 days.

(21) Appl. No.: 18/392,529

(22) Filed: Dec. 21, 2023

(51) Int. Cl.
*E05C 17/54* (2006.01)

(52) U.S. Cl.
CPC .................................... *E05C 17/54* (2013.01)

(58) Field of Classification Search
CPC ........................................................ E05C 17/54
See application file for complete search history.

(56) References Cited

U.S. PATENT DOCUMENTS 2,618,497 A 11/1952 Gardels
2,916,902 A 12/1959 Wamsley
2,919,946 A 1/1960 Miener
3,011,818 A 12/1961 Matthiessen
3,195,940 A 7/1965 Woodling
3,328,064 A 6/1967 Simon
3,668,908 A * 6/1972 Levy ........................ E05B 83/24 292/262
3,891,257 A * 6/1975 Wilson .................... E05C 17/36 292/262
4,191,413 A * 3/1980 Barner .................... E05C 17/36 24/302
4,278,280 A 7/1981 Rashbaum
4,659,122 A * 4/1987 Miller ..................... E05C 17/36 242/379.2
4,666,194 A 5/1987 Charman
4,667,993 A 5/1987 Hannesson et al.
5,297,828 A * 3/1994 Chung .................... E05C 17/36 292/262
5,647,619 A 7/1997 DiLisio
6,648,381 B2 * 11/2003 Holton .................... E05C 17/36 292/288
D545,304 S * 6/2007 Sergi .............................. D8/354
D586,205 S * 2/2009 Robbins, III .................. D8/380
D586,206 S * 2/2009 Robbins, III .................. D8/380
8,632,369 B2 * 1/2014 Lee ..................... H01M 50/505 439/766
D925,453 S * 7/2021 Kim ............................. D13/154
2009/0167048 A1 7/2009 Luca et al.
2011/0204674 A1 8/2011 Parnell
2012/0024921 A1 * 2/2012 Pryor ........................ B60R 9/00 224/315
2022/0127885 A1 4/2022 Mitchell et al.

* cited by examiner

*Primary Examiner* — Mark A Williams
(74) *Attorney, Agent, or Firm* — Bernhard P. Molldrem, Jr.

(57) ABSTRACT

A Trunk-lid Tie-down arrangement holds a car trunk lid or hatch lift-gate at a partly open position for transporting an oversize package or other large cargo piece. One component is an insert plate formed stainless steel or another suitably strong rigid material, with a pair of eye openings. The second component is a length of a cordage or rope, favorably ten feet long. One of the eye opening is inserted into the vehicle's latch for the lid or lift gate and is held there. The cordage extends from the other eye opening and can be tied to the hasp for the locking latch. At the delivery destination, the insert plate is removed by unlocking the lid or hatch gate, and the package can be removed.

13 Claims, 3 Drawing Sheets

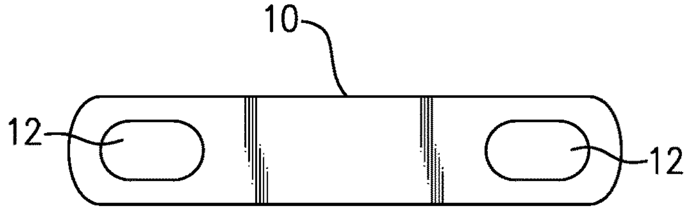
FIG.1
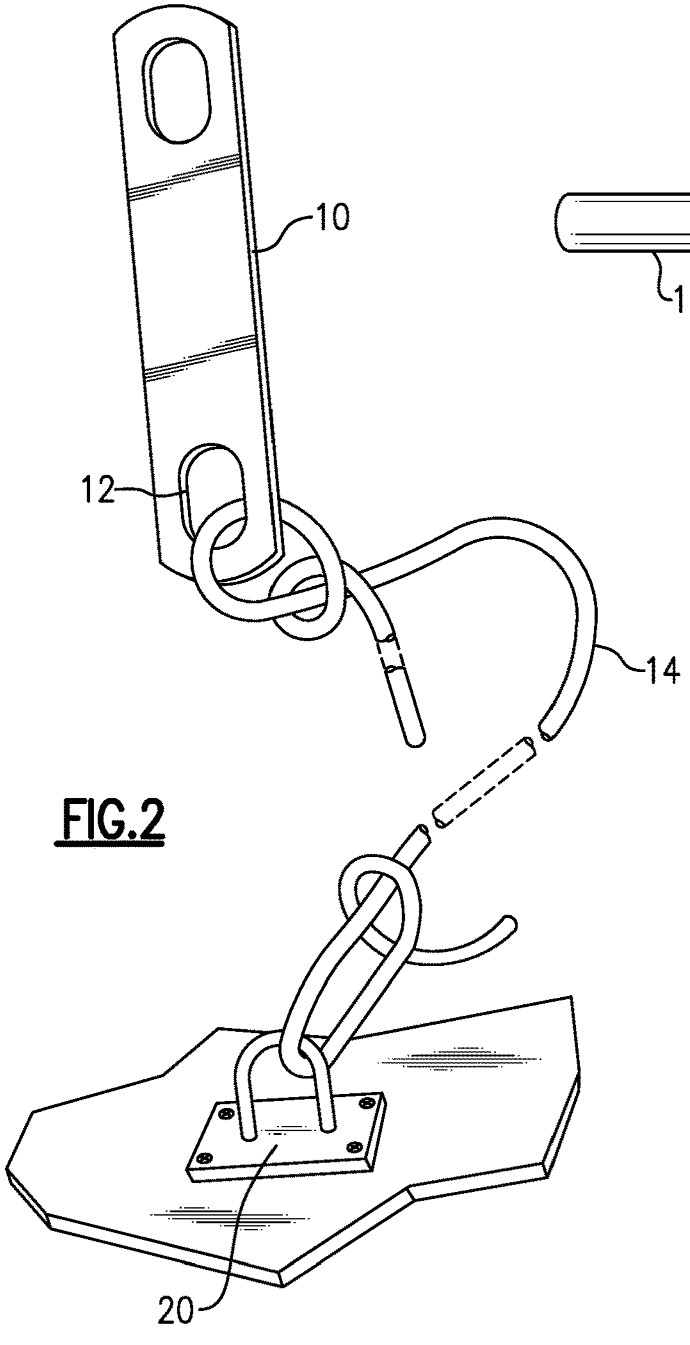
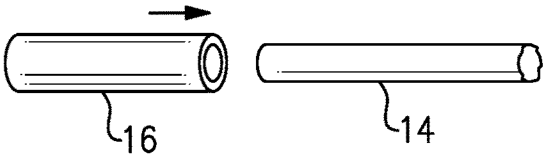
FIG.2A
FIG.2

TRUNK-LID TIE-DOWN

BACKGROUND OF THE INVENTION

The invention concerns a simple arrangement for holding a passenger car's trunk lid (or a rear hatch lift gate of a van or sport utility vehicle) partly open when transporting an overlarge piece of cargo, e.g., a chair or other furniture.

SUMMARY OF THE INVENTION

The device consists of two fairly simple components, one of which is an oblong insert plate or clip, i.e., a thin piece of steel about 3¾ inches long and ¾ inches across and about ⅒ inch thick, with a length direction and a width direction, and with eye openings at either end. In a preferred embodiment, two identical eye openings are each in the shape of a racetrack oval elongated in the length direction of the bar, and dimensioned about ⅝ inch long by 0.4 inches wide. The second component is a length of cord or rope, e.g. parachute cord, ten feet long (length is not critical). The rope or cord can be tied into either of the two eye-holes, with the other eye-hole being used to fit onto the trunk lid locking latch.

The rope is secured at one end to one of the eye-holes of openings, and the other opening is fitted into the latch of the trunk lid or hatch. A tongue or finger member of the latch, which ordinarily fits into the hasp member for the trunk lid or hatch gate. This locks the insert plate into the latch. The other (free) end of the rope is laced through the hasp of the trunk lock or hatch lock, and then can be laced through the one eye opening of the steel part, and tied either to the rope or cord, or to the metal part. This keeps the lid or door held at the partly-open position so the large piece of cargo does not fall out of the car, nor does the hatch or lid close onto it. The air spring of the lift gate or lid urges the hatch or lid toward its open position, but the rope or cord limits how far the gate or lid can open. The rope or cord can be looped at the mid point and then secured to the eye opening of the insert plate, so that there are two lengths of cord that can be attached to the hasp.

When the vehicle arrives at the destination, the trunk lid lock (or lift gate) can be unlocked by key or by actuating a push button or remote, which withdraws the lock tongue or finger and allows the insert plate to drop out. The lid or gate then opens fully and the cargo can be easily removed. The cord is then untied from the hasp, and the insert plate and cord can be wound up and stored in any convenient place in the vehicle or in the user's pocket.

In any of a number of possible embodiments, this trunk-lid hold-down arrangement may employ as its insert plate a rigid metal insert plate in the form of a blade member formed as a rigid metal flat bar of a suitable steel or equivalent rigid material, including possibly a technical plastic. Preferably the insert plate has a thickness of up to substantially an eighth inch (e.g., 12 gauge to fourteen gauge), and has a length of three to four inches, and a width of up to substantially one inch, and being provided with a pair of eye-hole openings at opposite ends of said blade member, each eye-hole opening being up to substantially one inch long, up to a half-inch wide, and with edges of the eye hole openings and edges of the rigid metal flat bar being blunt (so as not to cut into or damage the cord). Each of the eye-hole openings can be configured to receive a latch member of an associated trunk lid (or lift gate), and being also configured to receive therethrough a length of sturdy, flexible cording. The blade member can be formed of a 12-gauge to 14-gauge stainless steel with a length of substantially 3¾ inches and a width of ¾ inch, and with both ends of the blade member itself being rounded.

In a preferred arrangement, the eye-hole openings each have a length of 0.685 inches, a width of 0.410 inches, and rounded ends, so as to have a race-track oval shape. The eye-hole openings are each disposed on a main axis of the blade member and are rounded at their axial ends.

A suitable length of a strong flexible cordage (e.g., ten feed in length) has its ends secured from raveling by tubes of shrink-fit. The cordage is then secured to one of the eye-hole openings.

In the described embodiment this flexible cordage can be a braid of a length of substantially ten feet and a width or thickness of substantially one-eighth inch. The length of flexible cord can includes shrink-wrap tubing of substantially one inch length at each end thereof. The hold down arrangement may be sold as only the rigid metal blade or insert member with the customer to furnish his or her own cord, or the insert blade may be packaged and sold together with a suitable length (i.e., ten feet) of a suitable braid, rope or other cordage.

BRIEF DESCRIPTION OF THE DRAWING

FIG. 1 is a plan view of the insert plate of the trunk-lid hold-down according to one preferred embodiment of the invention.

FIG. 2 is an explanatory perspective view showing the insert plate, and cord tied both to one eye opening of the insert plate and to the hasp of the vehicle.

FIG. 2A illustrates a tubular portion of shrink-wrap being applied over one end of the cordage.

DETAILED DESCRIPTION OF A PREFERRED EMBODIMENT

Figure 3:
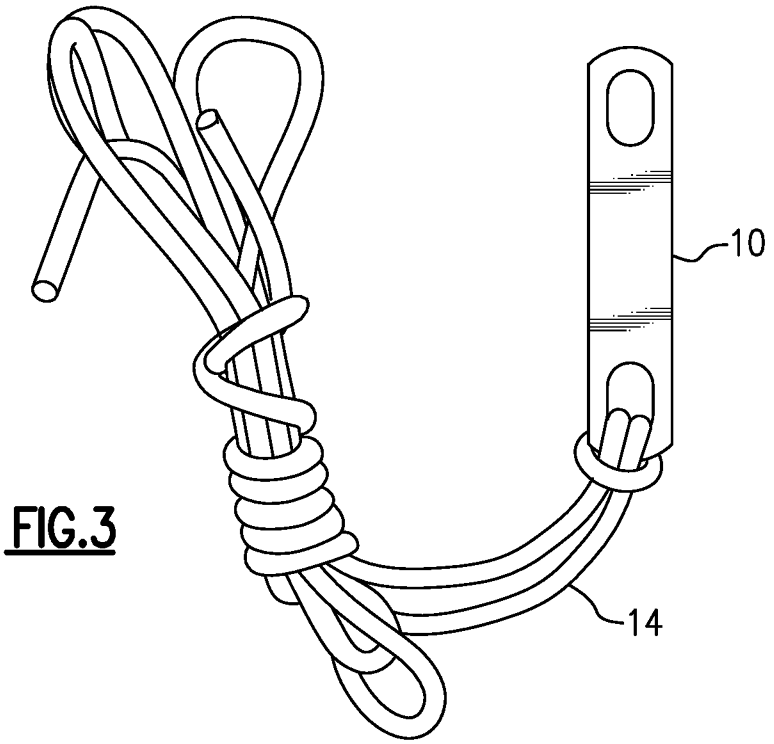
FIGS. 3 and 4 are views showing the cord tied alternatively at its midpoint to the insert plate and at its one end to the insert plate.

With reference to the Figures of Drawing, and initially to FIG. 1 thereof, an insert plate 10 of this invention comprises a flat elongated blade or clip formed of 12 gauge or 14 gauge No. 304 stainless steel, relatively thicker at its tips and rounded at its ends. Here, the insert 10 is 3¾ inches long, 0.41 inches across and 0.08 to 0.105 inches thick. There are two identical eye holes 12, one formed near each end, as shown. In this embodiment, the eye holes 12 are in the shape of racetrack ovals, aligned on the long axis of the insert plate 10, and 0.685 inches in length and 0.410 inches in width. The weight of the insert plate is 1.2 ounces. The front and back of the insert plate 10 are also identical. Either the front or rear side or both sides can be affixed with a brief instruction sheet which may also contain scannable images for contacting an explanatory web page.

FIG. 2 shows the insert plate 10 with a length of cordage 14 (rope or cord) tied at one end to one of the eye holes 12 of the insert plate 10, and a second end tied onto a hasp 20 of the vehicle's lock for the trunk lid or hatch lift gate. The hasp 20 is usually mounted on the floor of the trunk or of the rear cargo area or hatch of the vehicle.

FIG. 2A shows a cylindrical sleeve 16 of a heat-shrink material being applied over one end of the cordage 14. This material is then shrunk onto the cordage end using a heat gun of a suitable temperature.

Figure 4:
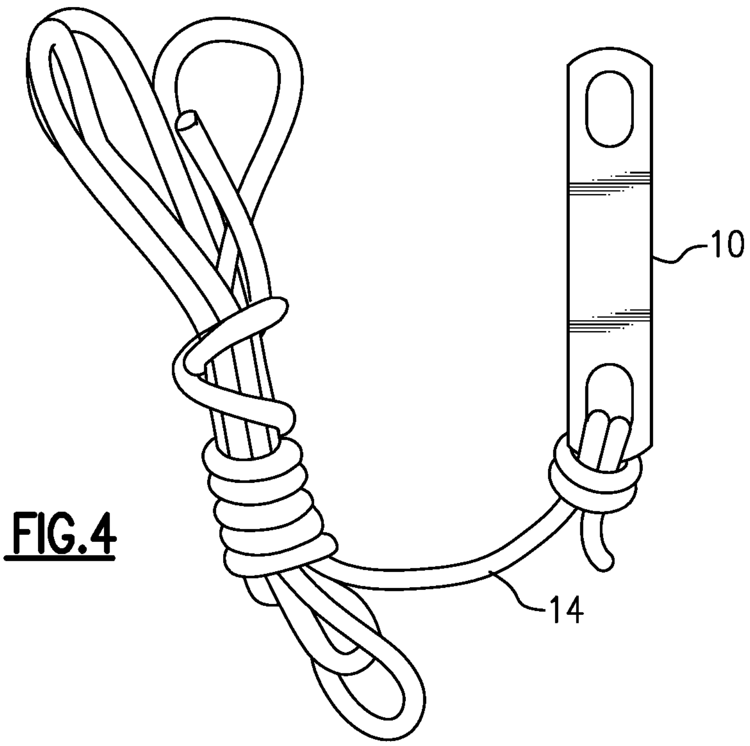

FIG. 3 and FIG. 4 show the cordage or rope 14 attached at its midpoint (FIG. 3) to one eye hole of the insert plate 10, with the cord then extending a pair of five-foot lengths; and with one end of the cordage 14 tied onto the one eye hole of the insert plate 10, so that the cord extends in a single ten-foot length. The user may easily arrange the hold-down either way, depending on the vehicle and the shape and size of the piece of cargo involved.

Figure 5:
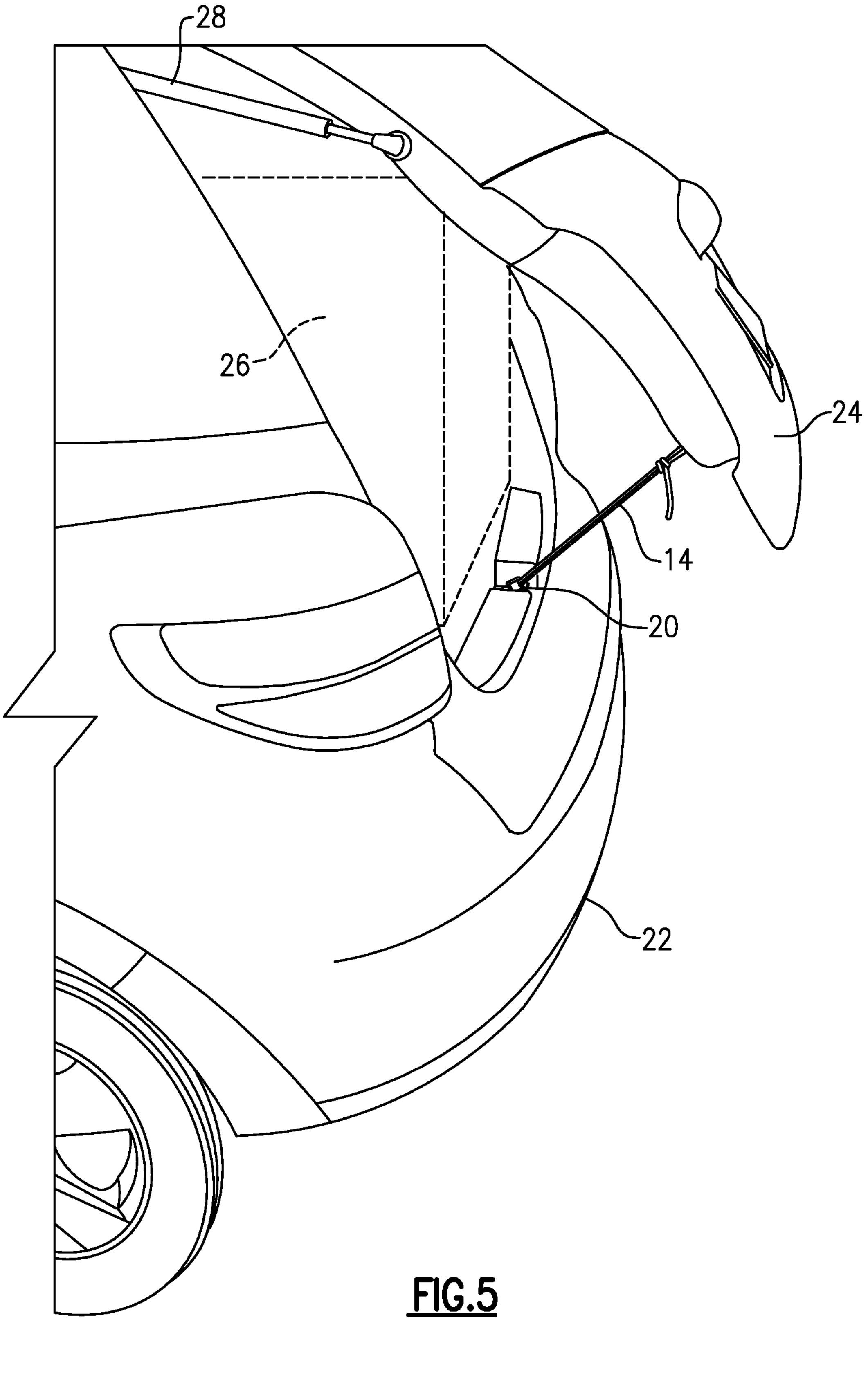
FIG. 5 illustrates the trunk-lid hold-down arrangement employed to hold the vehicle's hatch lift gate in a partially open position in order to accommodate an oversize article of cargo (shown in broken line).

FIG. 5 shows the trunk-lid hold-down arrangement of this invention in an automobile such as a sports utility vehicle 22, here with its lift gate 24 held in a partly open position. An oversize package 26, represented as a box drawn in broken line, is positioned in the hatch area ahead of the lift gate 24. The clip or insert plate 10, positioned in the locking latch, is obscured in this view, but the cordage 14 is shown leading to the hasp 20, where the cordage is tied off. Also shown here, an air spring 28 biases the lift gate 24 towards its raised or open position, so that the cordage 14 and air spring 28 maintain the lift gate 24 at its partly open position as shown. The cordage and insert plate can be released by unlocking the latch (with a key, a push button, or a remote device), which releases the lift gate 24. Then the insert plate 10 falls out from the trunk latch, releasing the cordage. After that, the cargo package 26 can be easily removed from the vehicle.

To assist many users who may not be proficient at knot-tying, an illustrated information sheet with instructions for several useful knots for securing the cordage may be included with the kit. Also, a buckle or clasp may optionally be used to secure the cordage.

Many modifications and variations to this trunk-lid hold-down may be constructed employing the principles of this invention, including substitution of materials, or constructing the parts, such as the insert plate 10 with a different geometry. The invention is not limited to the embodiment that is herein disclosed and illustrated. Rather the scope of this invention is to be governed according to the appended Claims.

What is claimed is:

1. A trunk-lid hold-down for a motor vehicle, the trunk-lid hold-down comprising a rigid metal insert plate in the form of a blade member formed as a rigid metallic flat bar of a suitable steel or, or the like, with the insert plate having a length direction and a width direction, the bar having a thickness of up to substantially an eighth inch, a length of three to four inches, and a width of up to substantially one inch, and being provided with a pair of eye-hole openings at opposite ends of said blade member, each eye-hole opening being oblong in the length direction of the bar, and up to substantially one inch long, up to a half-inch wide, and with edges of the eye hole openings and edges of the rigid metal flat bar being blunt and not sharp;

with each of said eye-hole openings being configured to receive therein a latch member of an associated trunk lid;

a length of sturdy, flexible cordage having an end secured to one of said eye-hole openings, and said cordage having another end configured to be secured to a hasp of a trunk-lid of the motor vehicle.

2. The trunk-lid hold-down according to claim 1, wherein said blade member is formed of a 12-gauge to 14-gauge stainless steel with a length of substantially 3¾ inches and a width of ¾ inch.

3. The trunk-lid hold-down according to claim 2, wherein both ends of said blade member are rounded.

4. The trunk-lid hold-down according to claim 3, wherein said eye-hole openings each have a length of 0.685 inches, a width of 0.410 inches, and rounded ends.

5. The trunk-lid hold-down according to claim 3, wherein said eye-hole openings each have a race-track oval shape.

6. The trunk-lid hold-down according to claim 3, wherein said eye-hole openings are each elongated along a main axis of the blade member and are rounded at their axial ends.

7. The trunk-lid hold-down according to claim 1, said flexible cordage further comprising a suitable length of a strong flexible cord secured to said one of said eye-hole openings.

8. The trunk-lid hold-down according to claim 7, wherein said flexible cordage is a braided cord of a length of substantially ten feet and a width of substantially one-eighth inch.

9. The trunk-lid hold-down of claim 7 in which said length of flexible cordage includes shrink-wrap tubing of substantially one inch length at each end of said cordage.

10. A trunk-lid hold-down for a motor vehicle comprising in combination, a rigid metal blade member formed as a rigid metal flat bar of a suitable steel or equivalent sturdy rigid material, having a thickness of substantially one-eighth inch, a length of substantially three to four inches and a width of substantially one inch, and being provided with a pair of eye-hole openings at opposite ends of said blade member, each said eye-hole opening being elongated along the length of the flat bar and substantially five-eighths inch to one inch long and substantially three-eighths inches in width, wherein edges of the eye hole openings and edges of the rigid metal flat bar being blunt and not sharp; each of said eye-hole openings being configured to receive therein a latch member of an associated trunk lid, and a length of a sturdy, flexible cording of substantially one-eighth inch diameter, said cording having an end being secured to one of said eye-hole openings, and said cording having another end configured to be secure to a hasp of a trunk-lid of the motor vehicle.

11. The trunk-lid hold-down according to claim 10, wherein said length of flexible cording is substantially ten feet long.

12. The trunk-lid hold-down according to claim 10 wherein said length of sturdy, flexible cording is a braided cord.

13. The trunk-lid hold-down according to claim 11 wherein said cording has a pair of ends, and includes a shrink-wrap tubing of substantially one inch length at each said end.

* * * * *